United States Patent [19]
Shimizu

[11] Patent Number: 5,714,944
[45] Date of Patent: Feb. 3, 1998

[54] SELECTIVE CALL RECEIVER FOR RECEIVING AT LEAST TWO KINDS OF TRANSMITTED INFORMATION SIGNALS

[75] Inventor: Eisaku Shimizu, Suwa, Japan

[73] Assignee: Seiko Epson Corporation, Tokyo, Japan

[21] Appl. No.: 466,681

[22] Filed: Jun. 6, 1995

Related U.S. Application Data

[63] Continuation of Ser. No. 97,305, Jul. 26, 1993, abandoned, which is a continuation of Ser. No. 712,224, Jun. 7, 1991, abandoned.

[30] Foreign Application Priority Data

| Jun. 8, 1990 | [JP] | Japan | 2-150163 |
| Jul. 26, 1990 | [JP] | Japan | 2-198835 |
| May 24, 1991 | [JP] | Japan | 3-120501 |

[51] Int. Cl.$^6$ .................. G08B 5/22; H04B 7/00
[52] U.S. Cl. .................. 340/825.44; 340/825.47; 455/38.3; 455/186.1
[58] Field of Search .......... 340/825.44, 825.47, 340/825.48, 825.22, 311.1; 455/38.3, 228, 343, 186.1

[56] References Cited

U.S. PATENT DOCUMENTS

| 4,713,808 | 12/1987 | Gaskill et al. | 340/825.44 |
| 4,839,639 | 6/1989 | Sato et al. | 340/825.44 |
| 4,845,491 | 7/1989 | Fascenda et al. | 340/825.44 |
| 4,894,649 | 1/1990 | Davis | 340/825.44 |
| 5,025,252 | 6/1991 | DeLuca et al. | 455/186.1 |
| 5,089,814 | 2/1992 | DeLuca et al. | 340/825.44 |
| 5,144,296 | 9/1992 | DeLuca et al. | 340/825.44 |

FOREIGN PATENT DOCUMENTS

| 0238097 | 9/1987 | European Pat. Off. | H04Q 7/02 |
| 2097158 | 10/1982 | United Kingdom . | |
| 2105077 | 3/1983 | United Kingdom . | |
| 2124001 | 2/1984 | United Kingdom . | |
| 2145259 | 3/1985 | United Kingdom . | |

*Primary Examiner*—Michael Horabik
*Assistant Examiner*—Edward Merz
*Attorney, Agent, or Firm*—Stroock & Stroock & Lavan LLP

[57] ABSTRACT

A receiver is provided to receive at least a first call number with accompanying message information and a second call number with accompanying common information (e.g. time, weather, stock quotes). The power is supplied to the wireless section of the selective call receiver only for the time period during which information associated with each call number is received. Further, the second call number is common to all receivers and may be received each time the first call number is received. To reduce the consumption of the power supply, the receiver is provided with an execution control signal which may be selectively operated either manually or automatically to control the reception of the second call number. When the second call number is not received or when information is not transmitted in time slots allocated for that purpose, a reduction in the consumption of the power supply is attained.

29 Claims, 8 Drawing Sheets

SELECTIVE CALL RECEIVER FOR RECEIVING AT LEAST TWO KINDS OF TRANSMITTED INFORMATION SIGNALS

This is a continuation of application Ser. No. 08/097,305, filed Jul. 26, 1993, now abandoned, which is a continuation of application Ser. No. 07/712,224, filed Jun. 7, 1991, now abandoned.

BACKGROUND OF THE INVENTION

The present invention relates generally to a selective call receiver, and, in particular, to a selective call receiver with a display having a time function capable of receiving at least two kinds of transmitted information signals.

With the expansion of today's market for selective call receivers with displays, the public views the receivers as portable data processing equipment rather than as simple and conventional individual selective call receivers (i.e., pagers). Increasingly, the receivers are required to provide greater functions including storing of received information, outputting data to external data processing equipment, displaying of received time in association with a clocking function, and automatic starting and stopping of the receiving operation. As use of these receivers become more popular, the demand increases for constructing a selective call receiver having the additional feature of a clocking function capable of displaying time. The time display function is in addition to the feature of displaying the received information.

However, in a selective call receiver with a display having a clocking function, the life of battery is generally reduced to three months. The wireless receiving section requires a large electric current consumption of the battery (e.g., a unit-4 battery), thereby greatly reducing the desirability of the receiver. If a small sized battery is used in responding to the demand for smaller sized receivers, the life of battery in the receiver becomes even shorter. As a solution to this problem, a conventional selective call receiver with a display is adapted to have a supplementary power source for its clocking function. However, by providing an additional element to the receiver an obstacle is created for achieving smaller size and lower price.

Further, the adding of clocking function causes a problem to the operability of the receiver. In other words, while a periodic adjustment is necessary for the clocking function, the operation is tedious for the user. As a solution the power consumption problem, there is a method in which information is broadcasted through the airways and an adjustment of time occurs when received by the selective call receiver. In this manner, time information is received with the individual call number. Further, clocking data is adjusted by judging whether it represents time information. However, since each receiver has a different call number from the other receivers, the time information must be commonly transmitted to all receivers with the specific call number associated with each receiver. Therefore, if adjustment of time is to be executed by receiving the time information, the transmission requires substantial time, labor and drain on the power supply.

Accordingly, it is desirable to provide a selective call receiver which is capable of reducing the power consumption of the battery. Further, the transmission of common time information may readily be performed at the transmitting station by setting a call number exclusively used for time information so as to automatically provide clocking data based on of the information accompanying such call number. The common signal transmission requires the receiver to be constructed so that the receiver can be selectively turned off, disabling the reception of time information, thereby reducing power consumption.

SUMMARY OF THE INVENTION

Generally speaking, in accordance with the present invention, a selective call receiver for receiving signals from a transmitter transmitting at least a first call number and a second call number, is provided. The selective call receiver includes at least a first individual call number and a second individual call number. A receiving device is provided for receiving at least a first call number. A comparison device is included for comparing the first call number with at least the first individual call number and the second individual call number to determine if a match exists between the compared call numbers. The transmitted information accompanying the first individual call number and the second individual call number is stored in a storing device when an affirmative match is made by the comparison device. A power source supply device supplies power to the receiving device for the time period in which the transmitted information accompanying the first individual call number or the second individual call number is received. During other periods, the power source supply means remains in a standby mode, thereby reducing the consumption of the power supply.

The selective call receiver is further provided with a state setting switch for setting an executed control signal to at least a first state and a second state. In the first state, the comparison device makes a comparison of the first call number and the second call number. In the second state, the comparison device only makes a comparison of the first call number. The state setting switch sets the execution control signal to the second state when the storage device has completed storing the second call number with the accompanying transmitted information. In this manner, the comparison device halts making comparison of the second call number and thereby the power source supply device is no longer activated when the second call number is received.

In an another embodiment of the selective call receiver, the state setting switch may be manually set to control the state of the execution control signal between a first state and a second state. Once the storage device has completed storing the second call number with the accompanying transmitted information, the state setting switch sets the execution control signal to the second state. Further, the comparison device stops making the comparison of the second call number and the power source supply device is restricted from consuming power.

In an alternative embodiment, the execution control signal is pre-set to the first state. The comparison device then compares the first call number with at least a first individual call number and the second individual call number and determines if a match exists between the compared call numbers. When the storage device is completed storing the second call number with accompanying transmitted information in accordance with the determination of the first set state, the state setting switch switches the execution control signal to a second state. In this manner, the comparison device does not make a comparison of the second call number and therefore restricts the power consumption of the power source supply device.

As another feature of the selective call receiver, the execution control signal may be initialized to the first state each time the selective call receiver is turned on. In this configuration, the selective call receiver is typically turned on once a day. Therefore, the receiving of the second call receiver occurs only during initial turn on of the selective call receiver. Accordingly, once the storage device has completed storing the second call number, the state setting switch changes the execution control signal to the second state so that consumption of power is again reduced.

In still another embodiment of the invention, the execution control signal is periodically reset by the state setting switch so that the second call number can be received. In this embodiment, the second call number is received only during the time period that the execution control signal is reset to the first state. The first state is set once every hour according to the preferred embodiment. Upon completion of the receiving and storing of the second call number associated with the first state, the execution control signal is switched to the second state. Therefore, power consumption savings can again be realized and the execution control signal remains in second state until the time interval expires so that the execution control signal switches back to the first state.

Accordingly, it is an object of the present invention to provide an improved selective call receiver which conserves the power consumption requirement of the receivers internal battery when the call numbers are being received.

Another object of the invention is to provide an improved selective call receiver which is capable of reducing the operation by the user by providing clocking data and time adjustment based on the reception of a first and second call numbers.

Still other objects and advantages of the invention will in part be obvious and will in part be apparent from the specification.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
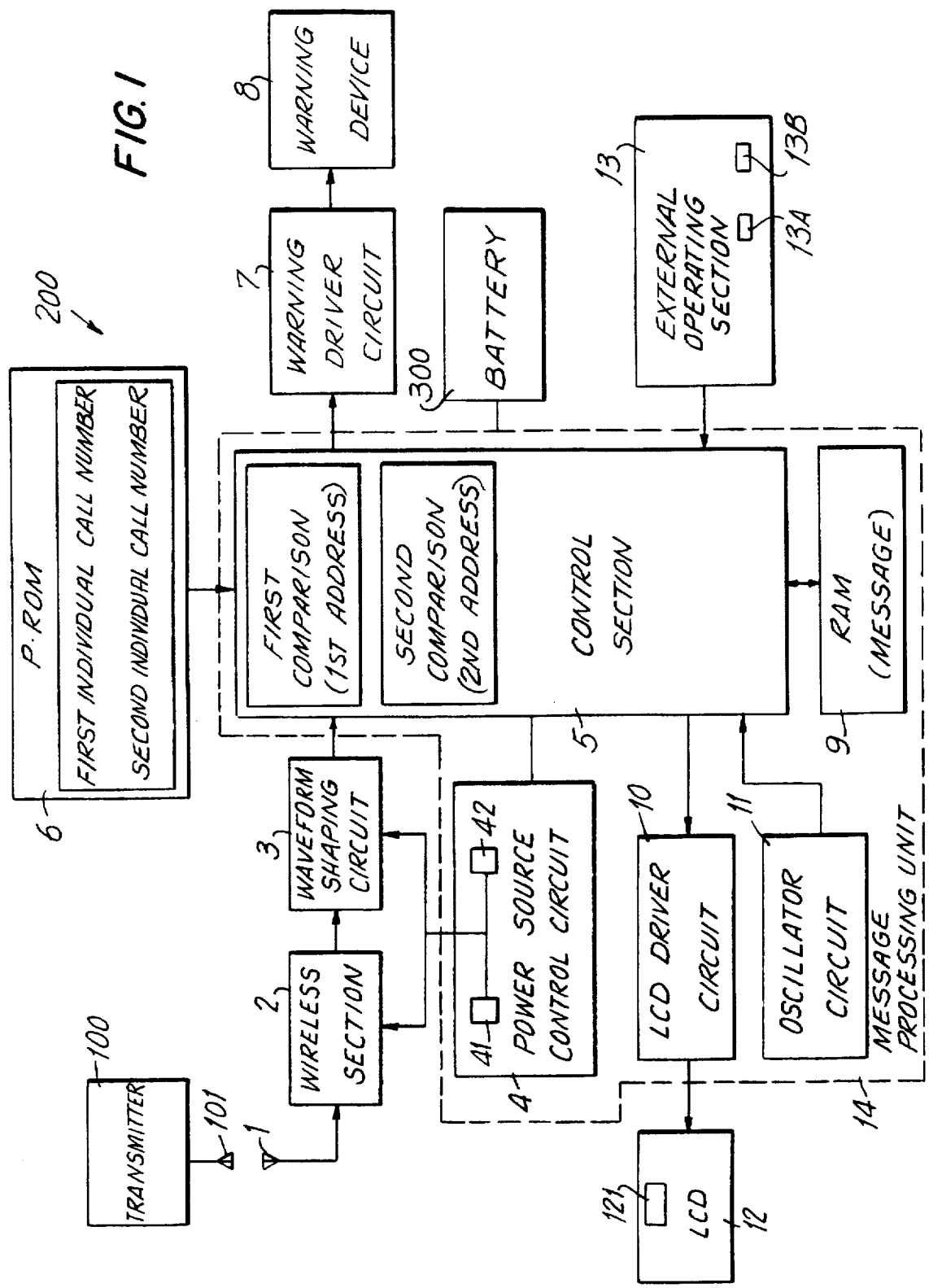
FIG. 1 is a block circuit diagram showing the structure of the selective call receiver constructed in accordance with the present invention.

As shown in FIG. 1, a selective call receiver is provided including a wireless transmitter 100 having a transmission antenna 101 and at least one receiver 200. The receiver of the first embodiment is formed such that the receiving of time adjusting information may be restricted by a manual operation. This receiver is provided with a built-in antenna 1 adapted to receive an external signal from transmitter 100, a wireless section 2 including a frequency discriminator, and a waveform shaping circuit 3. The receiver further includes a power source control circuit 4 for controlling the power supply to wireless section 2 and waveform shaping circuit 3. A control section 5 is provided for, among other functions, activating power source control circuit 4.

An internal power supply (e.g. a battery 300) is provided. Wireless section 2 and waveform shaping circuit 3 consume the most power in receiver 200, while the other components of receiver 200 consume little power. Accordingly, it is required to supply power intermittently to wireless section 2 and waveform shaping circuit 3. At the same time, power from battery 300 is continuously supplied to other components of receiver 200. Power source control circuit 4 has a first power supply device 41 and a second power supply 42 for supplying power in different modes to wireless section 2 and waveform shaping circuit 3.

As will be explained in greater detail below, first power supply 41 supplies power intermittently to wireless section 2 and waveform shaping circuit 3 to detect a preamble signal and a sychronous signal SC. The received signals will then be compared to a first batch and an individual call number. In addition, second power supply 42 intermittently supplies power to wireless section 2 and waveform shaping circuit 3 from battery 300 until a common time information signal is detected in a third frame of each batch. Second power supply 42 ceases supplying power after time information is read into receiver 200 or alternatively is turned off in accordance with a switching mechanism.

The receiver is further provided with a programmable read only memory 6 (hereinafter "P-ROM"). P-ROM 6 stores addressable individual call numbers which are compared at control section 5. A random access memory 9 (hereinafter "RAM") stores message information accompanying the individual call number. A liquid crystal display driver circuit 10 drives a liquid crystal display 12 (hereinafter "LCD") on which information is displayed. An oscillator circuit 11 is oscillated to form a clock signal used in driver circuit 10. Power source control circuit 4, control section 5, RAM 9, LCD driver circuit 10 and oscillator circuit 11 are combined to form a message processing section 14 which are all powered by battery 300.

Message processing section 14 is defined by a one-chip microcomputer. The message processed at the message processing section 14 is displayed by LCD 12. Once a message has been stored in RAM 9 by message processing section 14, a warning device driver circuit 7 is actuated. Warning device driving circuit 7 switches on a warning device 8 such as an LED or vibrator so that the operator is informed that information has been stored in the receiver. Further, an external operating section 13 is provided for manually operating the receiver. External operating section 13 is arranged with a receiving standby mode select switch 13A and an automatic receiving mode select switch 13B to control the setting mode of the receiver.

A signal transmitted at a predetermined radio frequency from transmitter 100 is received by antenna 1 and then demodulated at wireless section 2. Next, the signal is converted into a rectangular wave at waveform shaping circuit 3. Power is supplied to wireless section 2 and waveform shaping circuit 3 by power source control circuit 4 as more particularly described below.

Control section 5 generates a battery saving time signal for the management of power supply. Further, control section 5 controls power supply circuit 4 and performs bit synchronization and frame synchronization for the received signal. A comparison function with error control is performed between the individual call number recorded in P-ROM 6 and the received signal having a rectangular waveform supplied from waveform shaping circuit 3. In this manner, control circuit 5 determines if the stored individual call number has been called by comparing the recorded individual call number with the received signal. In addition, a measuring function is provided in control section 5 for measuring the signal from oscillator circuit 11. Oscillator circuit 11 may include a crystal to serve as a source of the reference signal.

Once the individual call number is verified, message data accompanying the individual call number data may be subsequently received and stored in RAM 9. Thereafter, the user is warned that a message has been stored in RAM 9 by warning device 8 by way of warning device driver circuit 7. The message stored in RAM 9 may be sent to LCD driver circuit 10 by way of control section 5 by operating a switch (not shown) on external operating section 13 so that the message is displayed by LCD 12. Finally, a clock signal from oscillator circuit 11 is sent to LCD driver circuit 10.

Figure 2:
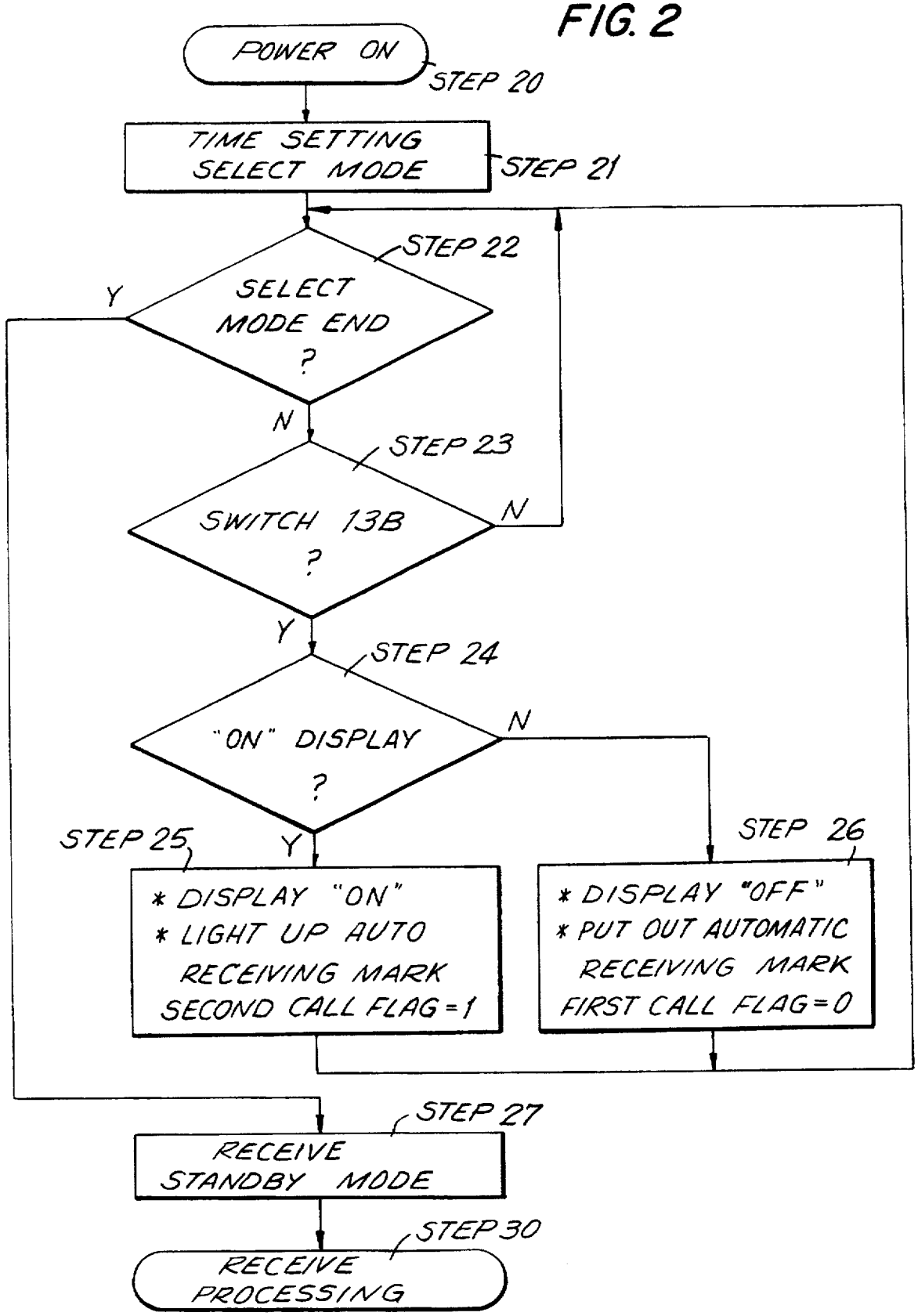
FIG. 2 is a flowchart for use in explaining a control operation of a time setting select mode in accordance with a first embodiment of the invention.
Figure 3:
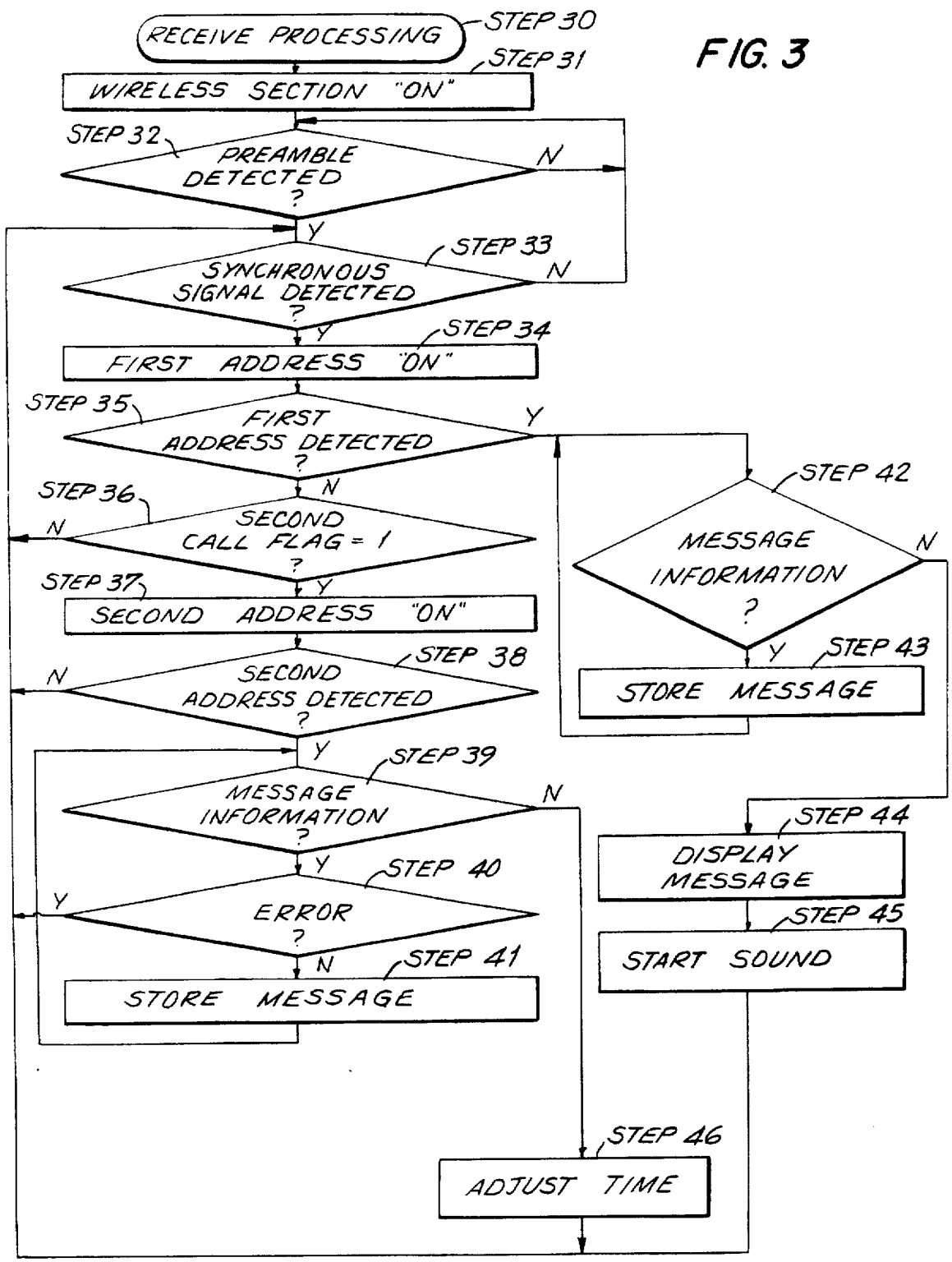
FIG. 3 is a flowchart for further use in explaining the control operation for a receiving process of the first embodiment of the invention.

The controlling operation performed by control section 5 of the receiver is set forth in accordance with invention in the flowcharts shown in FIGS. 2 and 3. The power source switch of the receiver is turned on in a Step 20. The system then proceeds to a Step 21 where a time setting select mode is commenced. The operation of the select mode occurs in a Step 22. During this step, a determination is made as to whether an adjustment of time is required based on the transmitted time information. If a receiving standby mode switch 13A is operated at external operating section 13, the system is shifted to a Step 27 at which the select mode is terminated. However, if receiving standby mode switch 13A is not operated, the system proceeds to a Step 23.

At the initial stage, the select mode is in an OFF state such that automatic receiving of time information is impossible. Therefore, the adjustment of time is not effected. When automatic receiving mode select switch 13B is operated on external operating section 13, the state of the control section 5 is changed to an ON state. In this state, automatic receiving is possible and the adjustment of time may be automatically effected based on the received time information. If switch 13B is not operated, the system returns to Step 22. However, when switch 13B is activated, the receiver is directed to a Step 24.

In Step 24, when switch 13B is again operated while in the ON-state at which automatic receiving of time information is possible, the ON-state is changed to the OFF-state. The ON/OFF states may be repeatedly changed by operating switch 13B. Switches 13A and 13B may be operated by pressing. It is noted that the other components of receiver 200 are always supplied power when switches 13A and 13B are in an ON state.

Figure 4B:
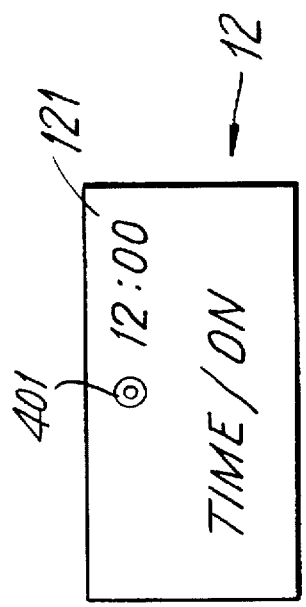
FIGS. 4a and 4b are top plan views of the display in the time setting select mode of the first embodiment.
Figure 4A:
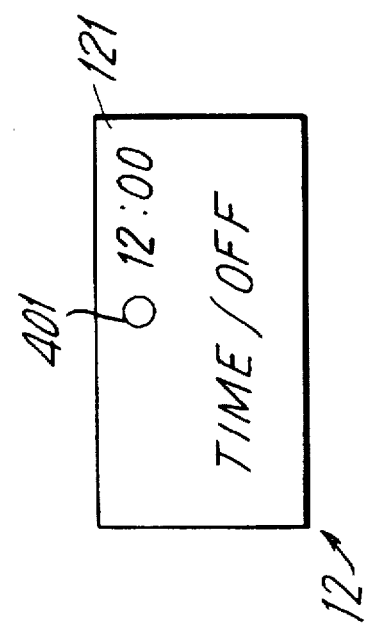

The ON-state is displayed as shown in FIG. 4b and controlled by Step 25. Specifically, an automatic receiving mark 401 is lit up on a display surface 121 of LCD 12 and "TIME/ON" is displayed on display surface 121. In the ON state, the second calling flag is set to "1". At the same time, the OFF-state is displayed in FIG. 4a and controlled by a Step 26. In the OFF state, the light at the automatic receiving mark 401 is put out or an indicator is otherwise rendered invisible and "TIME/OFF" is displayed on display surface 121, while the second calling flag is set to "0".

Figure 5:
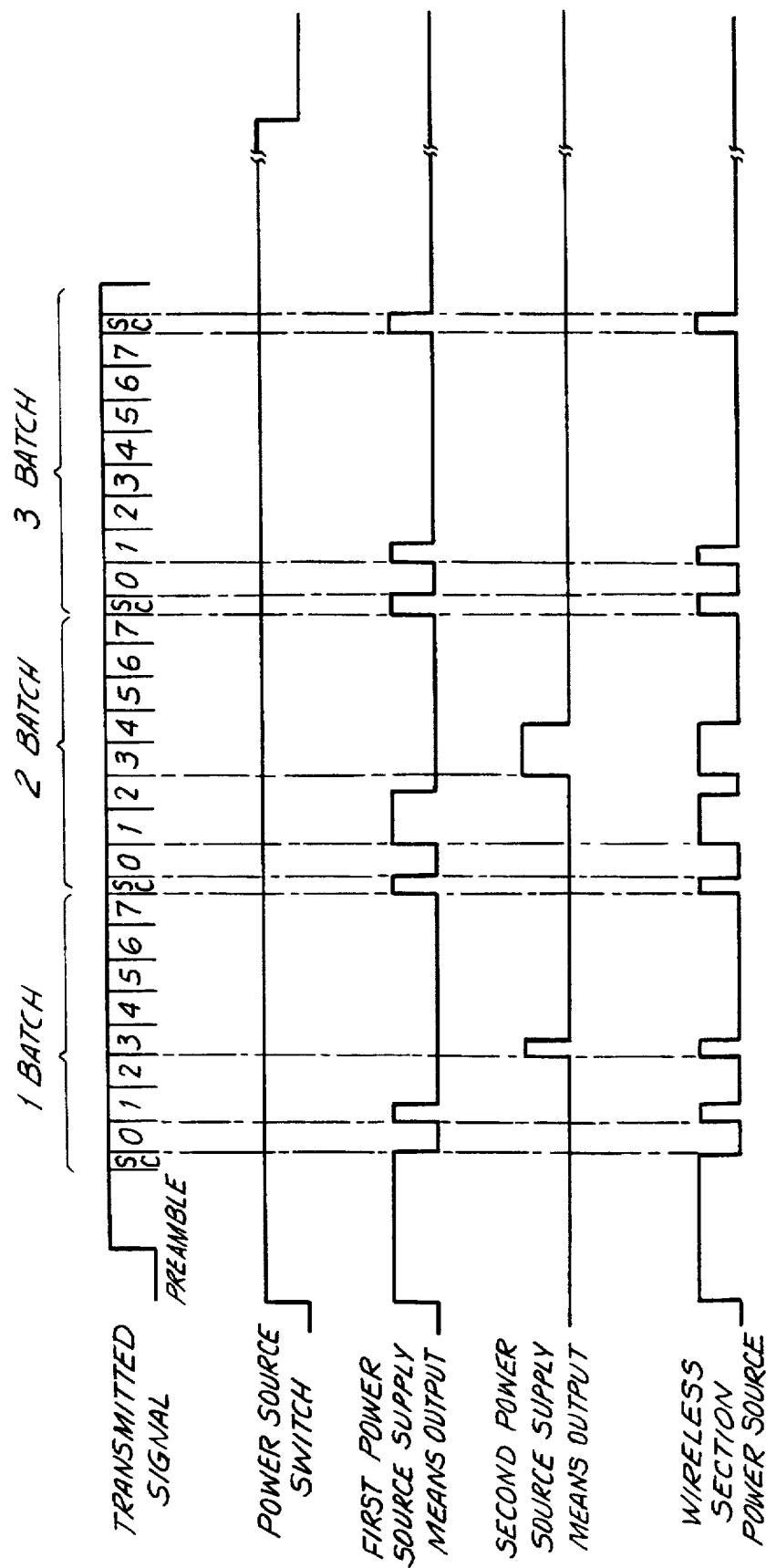
FIG. 5 is a timing chart illustrating the state of a power supply source of the first embodiment.

If receiving standby mode switch 13A is pressed in Step 22, the system enters the receiving standby mode in which a message (including time information in the case of ON-state) may be received in Step 27. From Step 27, the system proceeds to receive processing as shown in FIG. 3. The signaling system of control section 5 is energized as shown by the timing charts of the power sources in FIG. 5. A POCSAG format (i.e. Post Office Code Standardization Advisory Group) as shown in FIG. 5 is used. Each batch of the transmitted signal is formed from 7 to 8 frames. A first address representative of the first individual call number serves as the call number for receiving a normal message and is set in the first frame of the signal. A second address representative of the second individual call number serves as the call number for time information and is set in the third frame of the signal.

Once a signal has been received in Step 30 of the receive standby mode, the power is turned on in a Step 31. More specifically, at that moment, power is supplied to wireless section 2 and waveform shaping circuit 3 from a first power supply device 41. First power supply device 41 is activated for receiving normal messages at timings corresponding to the first frame in which the first individual call number, a preamble signal and a synchronous signal SC is set. Detection of the preamble signal continues in a Step 32. When a preamble signal has been detected, the system proceeds to Step 33. In Step 33, detection of the synchronous signal SC is performed. If the synchronous signal SC is not detected, within a fixed period of time, the system returns to Step 32. However, if synchronous signal SC is detected, power is supplied to wireless section 2 from first power source supply device 41 at the timing of the first frame in a Step 34.

Next, the first comparison device for the first address in control section 5 makes a comparison to determine if the first address has been received representing the first individual call number in a Step 35. If the first address has been received, the system proceeds to Step 42. If the first address has not received, the system is brought into a battery saving state and proceeds to a Step 36. At Step 36, if the second calling flag is "1", the system proceeds to Step 37. However, if the second calling flag is not "1", wireless section 2 is brought into a battery saving state and the system returns to Step 33. In this manner, the system is returned to a standby mode to continue the intermittent detection of synchronous signal SC.

Since the calling flag is set to "1", power is supplied to wireless section 2 from a second power supply device 42 at the timing of the third frame in Step 37. The energization achieves an ON-state for control section 5 such that the second comparison device for the second address is activated in a Step 38. The second comparison device in control section 5 make a comparison to determine if the second address has been received. If the second address has been received, the system proceeds to a Step 39. If the second address has not been received, the system returns to Step 33 as in Step 36.

If the second address has been received, a judgement is made as to whether the signal is a message in a Step 39. If the message contains no information (i.e., empty information or idle code) and is therefore not representative of message information, message receiving is terminated. The system is then returned to the battery saving state and proceeds to time adjustment at a Step 46. The time information is stored in the clocking storing area of RAM 9 to then be adjusted accordingly. Once time adjustment has been made, the system again returns to Step 33 to continue the detection of synchronous signal SC.

However, if message information (i.e., time information) is detected, a judgement is made as to whether there is an error in the message in a Step 40. If an error is detected in the message, the system returns to Step 33 as in Step 36. If there is no error in the message, the message information is stored in RAM 9 in Step 41. The system is then shifted back to Step 39 to make a verification as to whether the message information is continued.

Generally, if the first address has been received at Step 35, a judgement is made on whether the received signal is a message at a Step 42. If the message with the first address contains no information (i.e., empty information or idle code) and is therefore not representative of message information, the system returns to Step 33.

However, if message information is received at Step 42, the message information is stored in RAM 9 at a Step 43. The message stored in RAM 9 is then displayed by LCD 12 in a Step 44. Based on the received function information, warning device driver circuit 7 is driven to cause an alarming sound. Once the alarm has sounded, the system again returns Step 33 to continue detection of the next synchronous signal SC.

More specifically, in Step 33, when the synchronizing signal is detected, an operation of "FIRST ADDRESS 'ON'" is executed at a Step 34. At this point, power is supplied to wireless section 2 at the timing of the first frame as shown in FIG. 5. During the period at which power is supplied, an operation "FIRST ADDRESS DETECTED" is executed at a Step 35 in which the first comparing means of control section 5 determines whether or not an address is detected. If the address is detected, an operation "MESSAGE INFORMATION" at a Step 42 is conducted to determine whether or not the address information is followed by any message. If signals carrying any message are detected, an operation "STORE MESSAGE" at a Step 43 is executed. This operation is continued as long as the message information continues to be received.

If any other address signal or empty information (idle signal) is detected after the detection of the above-mentioned first address, the receiving operation including the supply of electrical power to wireless section 2 is completed. After completion of storage of the message, the process proceeds to "DISPLAY MESSAGE" at a Step 44 in which the stored message is displayed on LCD 12. In the event that no message is received, such information is also displayed on LCD 12. Then, after executing "START SOUND" at a Step 45 in which a sound such as a beep is generated to inform the recipient of the message, the process returns to Step 33 to start the operation for detecting the next synchronizing signal.

Reference is now made to FIG. 5 which depicts a timing chart for first power supply device 41 and second power supply device 42. The second address representative at the second individual call number is received at the batch by which the synchronous signal is transmitted a second time by second power supply device 42. At that moment, second power supply device 42 is activated and time information is received by control section 5. Thereafter, the second calling flag is set to "0". Accordingly, in subsequent batches, power is not supplied to wireless section 2 and waveform shaping circuit 3 from second power source supply device 42 at the timing of a third frame in which the second address is set. Therefore, the consumption of the power source is reduced from that point as it relates to receiving time information.

When automatic receiving mode select switch 13B is operated, the time setting select mode is switched to an ON-state to allow for automatic receiving of time information. Therefore, the second calling flag is set to "1". In this state, message information associated with the first address and time information associated with the second address are received and the adjustment of time is possible. On the other hand, when automatic receiving mode select switch 13A is pressed, the time setting select mode is switched to an OFF-state and the second calling flag is set to "0". In addition, power is supplied to wireless section 2 only at the frame corresponding to the first address. Accordingly, only message information associated with the first address representative of the first individual call number is received and adjustment of time is not possible.

The ability to set the second calling flag enables the user to make a selection as to whether or not an adjustment of time should be conducted. For example, near the border of different time zones, an overlapping of electromagnetic waves with the next zone is likely to occur. Therefore, an adjustment of time is required, because of the reception of the time from the next zone where the electromagnetic wave is outputted is more intensive. Therefore, the receiver makes an unnecessary time adjustment. However, by setting the second calling flag to "0", it is possible to prohibit an automatic adjustment of time. On the other hand, it is conceivable that by setting the second calling flag to "1" a global watch is created by setting the time to that of another region as one travels through different time zones. However, if the user desires to prohibit an adjustment of time during his travels such selection may be easily made.

Figure 6:
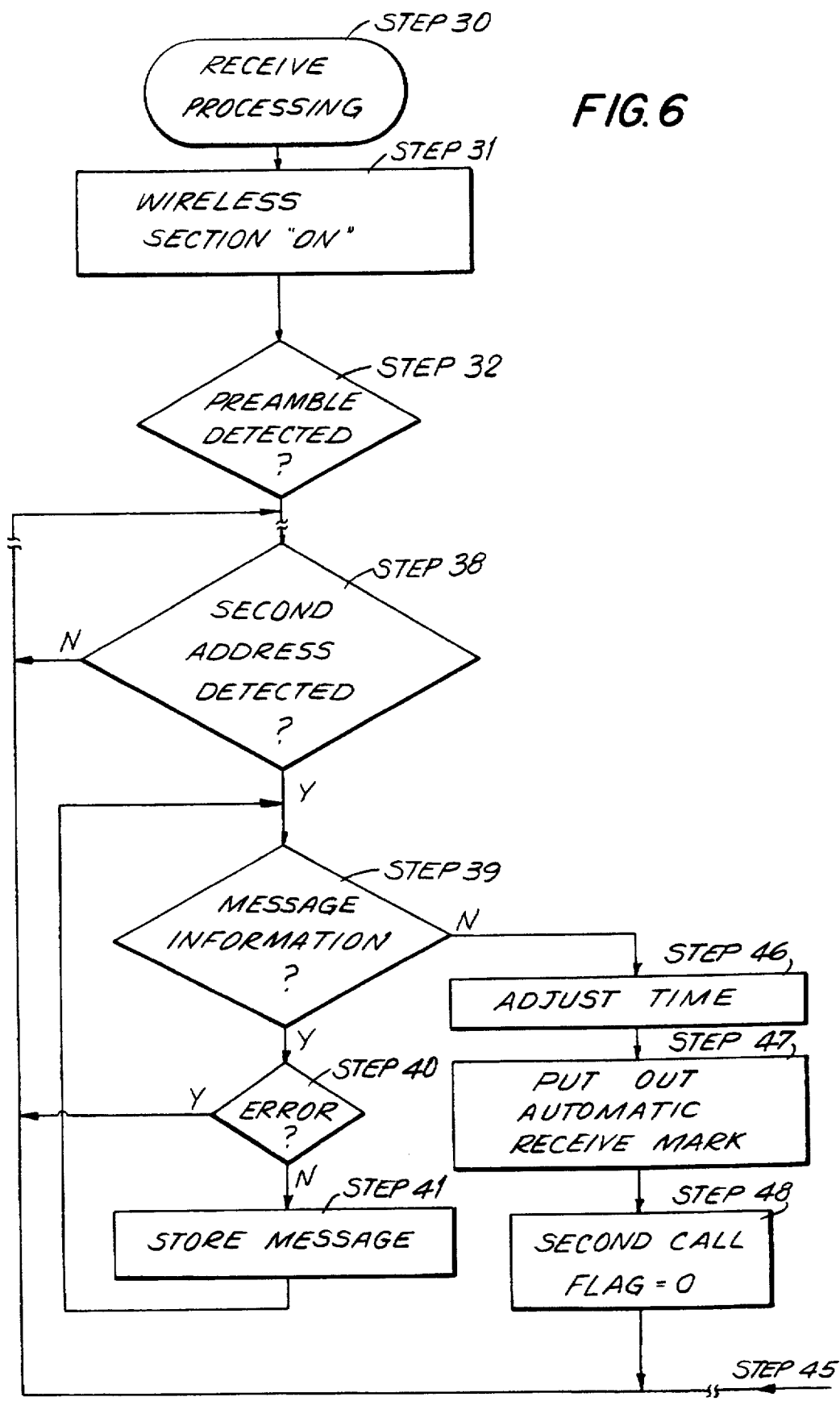
FIG. 6 is a flowchart for use in explaining the control operation in accordance with a second embodiment of the invention.

Reference is now made to FIG. 6 which illustrates a second embodiment in accordance with the invention. This flowchart includes the steps of FIGS. 2 and 3, but adds a function to the receiver such that time information is not received after the first adjustment of time. Since the construction and operability features of the receiver of the present embodiment are substantially the same as that of the first embodiment, a description of common elements is incorporated herein by reference and the discussion thereof is omitted.

In the second embodiment, when the automatic receiving mode select switch 13B is pressed in the time setting select mode to select an ON-state, automatic receiving of time information is possible. During this period, the second calling flag is set at "1" and adjustment of time occurs at Step 46. Upon the completion of adjustment of time at Step 46, the light from automatic receiving mark 401 indicating the ON-state is switched OFF at a Step 47. Next, the second calling flag, previously set at "1", is now set at "0" in a Step 48. The system again returns to Step 33 to continue intermittent detection of synchronous signal SC.

Since the second calling flag is set to "0", wireless section 2 is operated only at the time period corresponding to the first address when a synchronous signal SC is again detected and received. Thus, when synchronous signal SC is detected, time information associated with the second address is not performed. However, if time adjustment is desired, the time setting select mode may again be switched to change the second calling flag to "1" and thereby allow the second address to be received.

Therefore, power is not supplied to wireless section 2 for the timing of the second address once the first adjustment of time has been performed in this selective call receiver. Accordingly, the consumption of power source is reduced. In other words, although time information is periodically broadcasted after the first time adjustment of the second address, only the message information associated with the first individual call number is received. Since receiving of time information is omitted until time adjustment is selected by the user, a savings of power consumption is attained.

In both the first embodiment and second embodiment, the time setting select mode may be selected when power is introduced. However, the selective call receiver may be constructed such that the mode is sequentially changed by mode select switch 13A. For example, any of the following sequence of steps could be obtained by activating mode select switch 13A: the message selecting mode switches to the message erasing mode which switches to the time setting select mode which switches to any other combination provided for by the selective call receiver.

Figure 7:
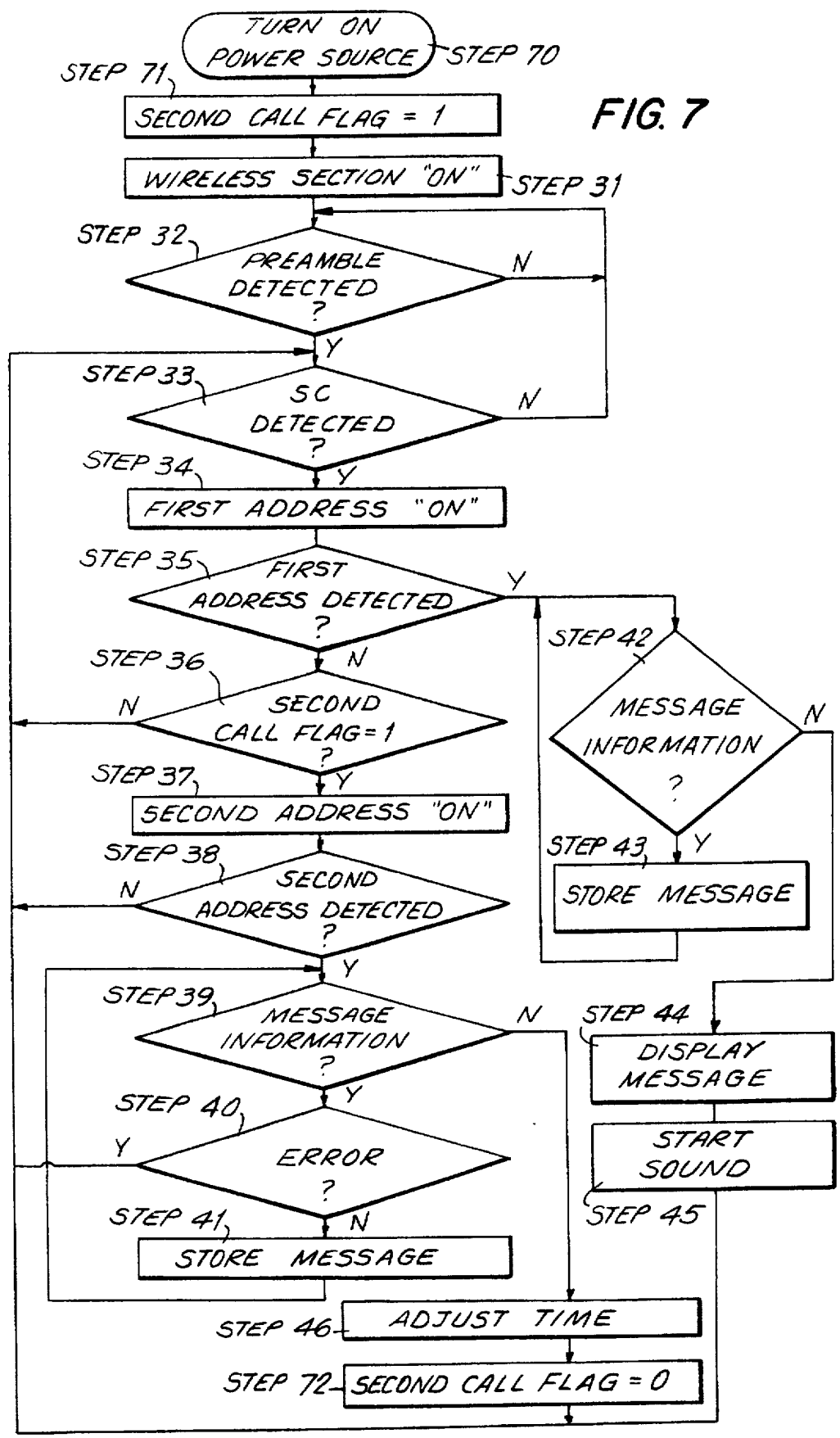
FIG. 7 is a flowchart for use in explaining the control operation in accordance with a third embodiment of the invention.

Reference is now made to FIG. 7 which depicts a selective call receiver in accordance with a third embodiment of the invention. In this selective call receiver, the second calling flag is initialized to "1" at the time of introducing power to the receiver. In addition, the selective call receiver performs time adjustment based on the received information. After the initial time adjustment, the second calling flag is set to "0". The construction of the receiver according to the third embodiment is substantially the same as the construction of the receiver shown in FIGS. 2 and 3. Since the construction and operability features of the selective call receiver of the third embodiment are substantially the same as that of the first and second embodiment, a description of common elements is incorporated herein by reference and the discussion thereof is omitted.

In the third embodiment, the power source of the receiver is turned on in a Step 70 and the system proceeds to a Step 71. In Step 71, the second calling flag is automatically set to "1". In this state, wireless section 2 is activated to an ON-state. Therefore, message information associated with the first address and a time information associated with the second address are received in the similar manner as described in the first embodiment. Accordingly, time adjustment occurs based on the received time information associated with the second address time at Step 46.

Upon the completion of time adjustment at Step 46, the second calling flag is set to "0" at a Step 72. Then, the system returns to Step 33 to continue intermittent detection of synchronous signal SC. When a synchronous signal SC is detected, only message information associated with the first address is received. Time information is no longer received, because the second calling flag has been set to "0".

In the receiver, the power source switch is normally turned on at Step 70 once a day. Therefore, time information is automatically received when the receiver is brought into its operating state to adjust the time on the receiver. Thus, the user is not required to pay attention to adjustment of time. Accordingly, time is adjusted upon the first use of the device so that accurate time is displayed on the receiver. Further, when the adjustment of time is completed, message information associated with the first call number is the only information that is received by the receiver, since time information is restricted from being received. Thus, saving on the power source associated with receiving of time information is possible.

Figure 8:
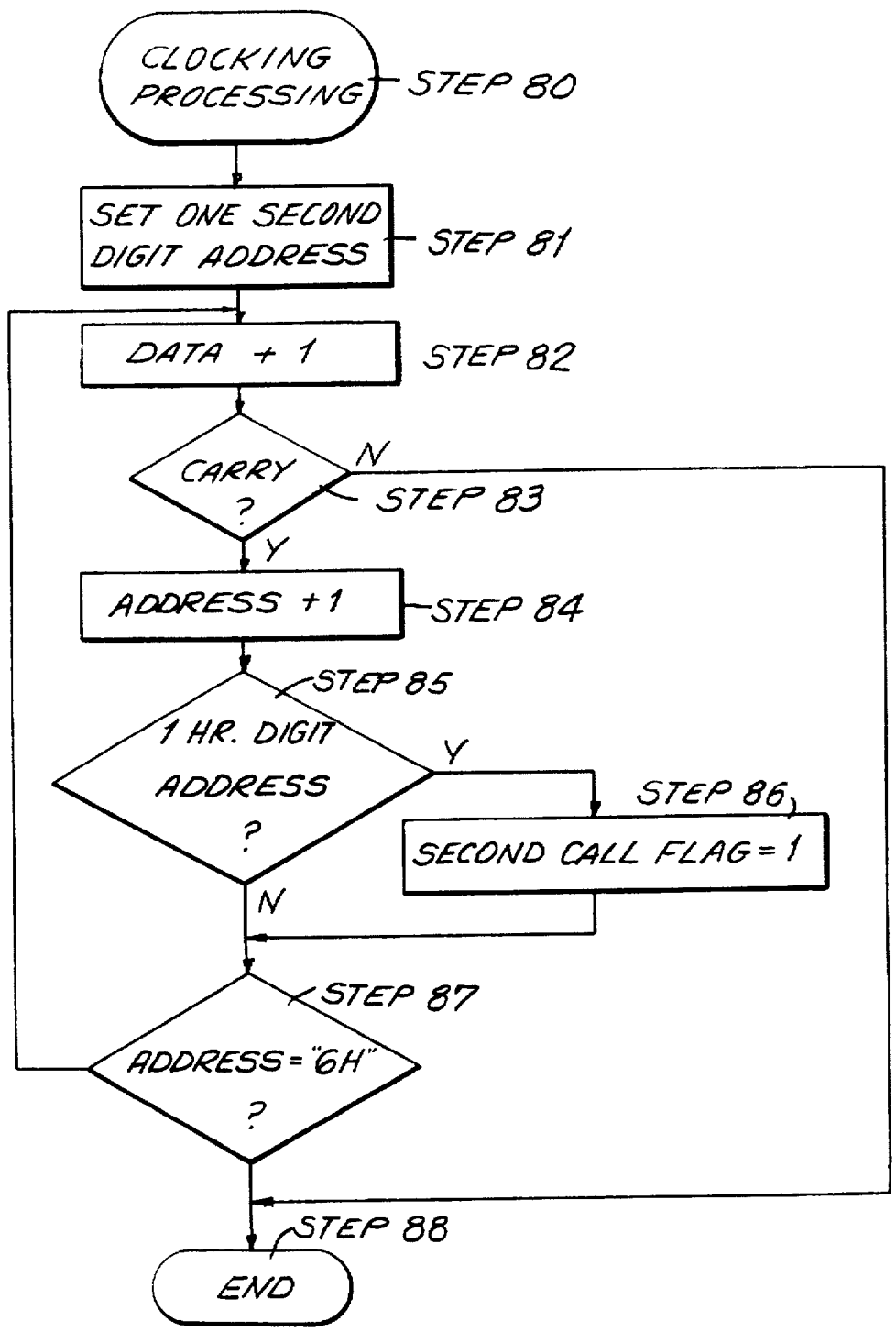
FIG. 8 is a flowchart for use in explaining the clocking operation in accordance with a fourth embodiment of the invention.

In accordance with a fourth embodiment of the invention and shown in FIG. 8, the flowchart of a selective call receiver is capable of adjusting time at a fixed interval of time. This receiver is provided with a time duration setting device for setting the second calling flag to "1" at a fixed interval of time. In the receiver of the fourth embodiment, the construction and control operation are substantially similar to those in the third embodiment and description thereof is omitted. Therefore, the steps of the first, second and third embodiments having the same function as those of the fourth embodiment are incorporated herein by reference.

The addresses for the clocking information in RAM 9 are determined as follows: "OH" for one-second digit; "1H" for ten-second digit; "2H" for one-minute digit; "3H" for ten-minute digit; "4H" for one hour digit; and "5H" for 10-hour digit. When an interrupt is activated by a timer at every second produced by a frequency divider, clocking processing is started at a Step 80. Therefore, the address "OH" of the one-second digit is set at a Step 81. In this manner, the contents of the designated address is increased by "1" in a Step 82. If no carry occurs in the clocking process, the clocking processing is completed and the system proceeds to the end at Step 88.

However, if a carry occurs in Step 83, the time information address is increased by "1" in Step 84. The new address is then judged whether a one-hour digit address of "4H" is present at a Step 85. If the address has one-hour address "4H", the second calling flag is set to "1" at a Step 86.

Next, the address is judged whether the clocking address is "6H" at a Step 87. The system proceeds to Step 87 from either Step 85 or Step 86 depending on whether a "4H" address has been judged. If the address at Step 87 is "6H", the clocking processing is completed and the system proceeds to Step 88. If the address is not "6H", the system returns to Step 82 so as to continue the clocking of the system until the system reaches the desired interval.

In the fourth embodiment of the receiver, the second calling flag is set to "1" at every hour. Accordingly, as set forth in the third embodiment, time information associated with the second address is received and executed at every hour to automatically effect the adjustment of time.

In the present embodiment, time adjustment is set to occur once every hour. However, the system may be designed to adjust time at any desired time period. Further, it is possible to combine the first or second embodiment to attain the function of the third embodiment or of the fourth embodiment to be executed when an ON-state is selected in the time setting select mode.

Accordingly, a selective call receiver of the invention includes an individual call number comparison device capable of identifying at least a first individual call number and a second individual call number. The selective call receiver is adapted to supply power to the receiving section only for the time period during which transmitted information unique to the individual call number is received. Thus, it is possible for transmitted information having the first individual call number unique to a specific receiver to be received separately from the transmitted information for all receivers. In other words, the transmitted information associated with the second individual call number such as a common time information shared by receivers may be restricted from being received by a specific receiver. Therefore, the transmitting station is not required to transmit common information to every call number specific to each receiver. However, the user of the receiver may receive common transmitted information at all times, if desired.

The advantage of the system is that power is supplied to the receiving section only for the time period during which a transmitted information associated with each individual call number is received. Thus consumption of power source is reduced, because the use thereof is restricted.

In the receiver of the invention, receiving of the second individual call number may be controlled by an execution control signal (i.e., calling flag). Therefore, the control of the flag makes it possible to select a state where the transmitted information, shared by receivers, associated to the individual call number is not necessary or a state where the same is not always required to be received. Thus, when commonly transmitted information such as a time information associated with the second individual call number is unnecessary, receiving may be prohibited to further restrict the consumption of the power source.

To solve the problems inherent in the prior art, the selective call receiver is provided with a timepiece section. A time adjusting device adjusts the time of the timepiece section based on the message information accompanying the second individual call number stored in the RAM. A display section for displaying the message information accompanying the first individual call number stored in the RAM and the time information of the timepiece section is provided.

In the selective call receiver, the information sent to each user of the selective call receiver is transmitted with the transmitted information accompanying a first individual call number. At the same time, information common to all selective call receivers is transmitted by assigning a common number to the selective call receivers representing the second individual call number.

Therefore, a call number and message information are received at the receiving section of the selective call receiver. The received call number and the first individual call number are compared with each other by the call number comparison device. When a match occurs between the called number and the first individual call number, power is supplied by the power supply device to the receiving section. However, power is supplied only during the time period when the message information accompanying the individual call number is received. The message information accompanying the first individual call number is received and stored in a memory device. The supply of power to the receiving section is stopped when receiving of such message information has completed.

Next, the received call number and the second individual call number are compared with each other by the call number comparison device. When a match occurs between the call number and the second individual call number similarly to the method of the first individual call number, the transmitted information accompanying the call number is stored in the RAM. During this time period, power is supplied to the receiving section only for the time period during which the information accompanying the second individual call number is received.

Further, an instruction is given by the execution control signal as to whether a comparison between the call number and the second individual call number is to be executed by the call number comparison device. The receiver may be designed such that it does not execute a comparison of the second call number based on the execution control signal. In this configuration, the selective call receiver may be controlled such that only transmitted information associated with the first individual call number is selectively stored. Therefore, information associated with the second individual call number is not updated, because it is not activated based on the execution control signal. Since the transmitted information accompanying the second individual call number is not received, the consumption of the power source is reduced.

Alternatively, the state of the execution control signal may be manually set. The selection as to whether the information associated with the second individual call number is to be updated is selected by the user of the receiver. Once the message information accompanying the second individual call number has been received, the execution control signal is set to the state at which an instruction for non-execution of comparison of the second call number is provided. Accordingly, even when the transmitted information is frequently broadcasted, the receiving section is not operated after the first time it had been activated, thereby restricting the consumption of the power supply source.

The execution control signal may be initialized to an ON state. After the first comparison, the execution control signal is then switched to an OFF state. In this manner, after the first comparison of the message information accompanying the second individual call number, the execution control signal is reset for non-execution after receiving and storing the first comparison of the second call number. In other words, once the first comparison of the second call number has been made, the receiving section does not enter the operating state even when such message information is being broadcast so that the consumption of power source is reduced. In another embodiment, the execution control signal may be periodically instructed to make a comparison of the second number.

The adjustment of time is thus based on the transmitted information accompanying the second individual call number. In this case, time information is broadcast by an individual call number common to all selective call receivers to reduce time used for broadcasting. Updating of such time information is selected by the user of the receiver or is preselected in the receiver. Accordingly, even though time information is broadcast at all times, the time information is only received once or at fixed intervals so as to reduce the consumption of the power source at the receiving section.

It will thus be seen that the objects set forth above, among those made apparent from the preceding description, are efficiently attained and, since certain changes may be made in carrying out the above method and in the construction set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A selective call receiver for receiving signals from a transmitter transmitting at least a first call number, a second call number and information associated with each, comprising:

receiving means for receiving said first and second call numbers and said information, said first call number being specific to at least one receiver and said second call number being associated with a plurality of receivers;

comparison means for comparing at least two internal call numbers, the first internal call number being compared with the first call number and the second internal call number being compared with the second call number and determining if a match exists between the compared call numbers;

storing means for storing the transmitted information accompanying at least one of the first call number and the second call number when an affirmative match is made by the comparison means;

state setting means for setting an execution control signal to one of at least a first state and a second state for determining whether the comparison means compares one or both of the received first and second call numbers with the internal call numbers, the first state being when only the first call number is compared to the first internal call number, the second state being when both the first call number and the second call number are compared to the respective internal call number, the state setting means switching from the second state to the first state after information associated with the first call number and the second call number is received; and power source supply means for selectively supplying power to the receiving means depending upon the status of the state setting means and the result of the comparison means for comparing the second call number with the second internal call number, in the first state the power source supply means supplies power to the receiving means only when information associated with the first call number is received, in the second state the power source supply means supplies power to the receiving means at a first predetermined interval when information associated with the first call number and the second call number is received and when an affirmative match of the second call number is made by said comparison means, the power supply means supplies power to the receiving means for receiving the information associated with the second call number at a second predetermined interval.

2. The selective call receiver of claim 1, wherein the state setting means is manually settable to selectively set the state setting means to the first state.

3. The selective call receiver of claim 1, wherein the second call number is associated with time setting or correcting, and including timekeeping means in said selective call receiver for receiving said information associated with said second call number.

4. The selective call receiver of claim 1, further including a power on means for turning the selective call receiver to a receive mode.

5. The selective call receiver of claim 4, wherein the state setting means initializes the execution control signal to the first state in response to the activation of the power on means.

6. The selective call receiver of claim 1, wherein the power on means includes a manual power switch.

7. The selective call receiver of claim 1, wherein the state setting means sets the execution control signal to the first state once every hour during the operation of the selective call receiver.

8. The selective call receiver of claim 1, further including display means for displaying the transmitted information accompanying the first call number stored in the storing means and the transmitted information accompanying the second call number stored in the storing means.

9. The selective call receiver of claim 8, wherein said display means includes indicia means for providing a visual indication of the state of the state setting means.

10. The selective call receiver of claim 1, wherein the storing means is a random access memory.

11. The selective call receiver of claim 1, wherein the state setting means is a switch.

12. The selective call receiver of claim 1, wherein the information associated with the second call number represents the current time stored in the storing means.

13. The selective call receiver of claim 1, wherein the first call number is an addressable number unique to less than all of the selective call receivers.

14. A method of receiving signals by a selective call receiver having at least a first internal call number and a second internal call number from a transmitter which transmits at least a first call number, a second call number and information associated with each, comprising the steps of:

receiving at least the first call number;

comparing the first call number with the first internal call number and determining if a match exists between the compared call numbers;

storing the transmitted information accompanying the first call number when a match has been found to exist; and selectively supplying power at a first predetermined period of time to a receiving portion of the selective call receiver after the information associated with the first call number is received;

determining if a state setting means is in a first state when only the information associated with the first call number is received and therefore reception of the transmitted signal is complete or the second state when both the information associated with the first call number and the second call number is received, and when said state setting means is in the second state, the method comprises the additional steps of:

receiving the second call number;

comparing the second call number with the second internal call number and determining if a match exists between the compared call numbers;

storing the transmitted information accompanying the second call number when a match has been found to exist; and selectively supplying power at the first predetermined period of time to a receiving portion of the selective call receiver before information associated with the second call number is received, and supplying no power at a second predetermined period of time to a receiving portion of the selective call receiver after the information associated with the second call number is received from the transmitter, said second predetermined period of time being longer than said first predetermined period of time.

15. The method of claim 14, further including setting the state setting means to the second state when the information associated with the second call number has been stored so that the second internal call number is no longer compared with the received signals unless said execution control signal is again changed.

16. The method of claim 14, further including manually setting the state setting means between the first state and the second state.

17. The method of claim 14, further including initializing the state setting means to the second state.

18. The method of claim 17, wherein said initializing is in response to the turning on of the power to said selective call receiver.

19. The method of claim 14, wherein the second call number is associated with the receiver and the second internal call number is associated with time setting or correcting, and including the step of counting time in said selective call receiver and resetting said counted time in response to the received information associated with the second call number.

20. The method of claim 14, wherein the second call number is associated with a plurality of selective call receivers and the first call number is specific to at least one selective call receiver.

21. A method of receiving signals by a selective call receiver having at least a first internal call number and a second internal call number from a transmitter which transmits at least a first call number, a second call number and information associated with each, comprising the steps of:

receiving at least the first call number;

comparing the first call number with the first internal call number and determining if a match exists between the compared call numbers;

storing the transmitted information accompanying the first call number when a match has been found to exist; and selectively supplying power at a first predetermined period of time to a receiving portion of the selective call receiver after the information associated with the first call number is received;

setting an execution control signal in a first state once every hour to determine if information associated with the first call number is received and therefore reception of the transmitted signal is complete or the second state when both the information associated with the first call number and the second call number is received, and when said state setting means is in the second state, the method comprises the additional steps of:

receiving the second call number;

comparing the second call number with the second internal call number and determining if a match exists between the compared call numbers;

storing the transmitted information accompanying the second call number when a match has been found to exist; and selectively supplying power at the first predetermined period of time to a receiving portion of the selective call receiver before the information associated with the second call number is received, and supplying no power at a second predetermined period of time to a receiving portion of the selective call receiver after the information associated with the second call number is received from the transmitter, said second predetermined period of time being longer than said first predetermined period of time.

22. The method of claim 21, further including setting the execution control signal to the second state when the second call number has been stored so that the second call number is no longer compared with the received signals unless said execution control signal is again charged.

23. The method of claim 14, further including displaying the stored information accompanying the first call number and the second call number.

24. The method of claim 19, further including displaying the stored information accompanying the first call number and the time.

25. The method of claim 21, further including displaying the stored information accompanying the first call number and the second call number.

26. The method of claim 25, further including providing a visual indication of the state of said execution control signal.

27. A selective call receiver for receiving signals from a transmitter transmitting at least a first call number having first information associated therewith and a second call number having second information associated therewith comprising:

comparison means for comparing a second internal number with the second call number and determining if a match exists between the compared numbers; and receiving means powered to receive said first information only periodically at a fixed interval and receive said second information at a variable interval, wherein said variable interval is varied after a match is determined by said comparison means.

28. The selection call receiver of claim 27, wherein said first information being specific to at least one receiver and said second information being associated with a plurality of receivers.

29. A selective call receiver for receiving signals from a transmitter transmitting at least a first call number, a second call number and information, comprising:

a receiver for receiving said first and second call numbers and said information, said first call number being specific to at least one receiver and said second call number being associated with a plurality of receivers;

a comparator for comparing at least two internal call numbers, the first internal call number being compared with the first call number and the second internal call number being compared with the second call number and determining if a match exists between the compared call numbers;

a storage device for storing the transmitted information accompanying at least one of the first call number and the second call number when an affirmative match is made by the comparator;

a state setting device for setting an execution control signal to at least a first state and a second state for determining whether the comparator compares one or both of the received first and second call numbers with the internal call numbers, the first state being when only the first call number is compared to the first internal call number, the second state being when both the first call number and the second call number are compared to the respective internal call number, the state setting device periodically switching between the second state and the first state; and a power source supplier for selectively supplying power to the receiver depending upon the status of the state setting device and the result of the comparator for comparing the second call number with the second internal call number, in the first state the power source supplier supplies power to the receiver only when information associated with the first call number is received, in the second state the power source supplier supplies power to the receiver at a first predetermined interval when information associated with the first call number is received but not when information associated with the second call number and the second call number is received and when an affirmative match of the second call number is made by said comparison means, the power supply means supplies power to the receiving means for receiving the information associated with the second call number at a second predetermined interval.

* * * * *